G. C. SCHUTT.
AUTOMOBILE SAFETY SIGNAL.
APPLICATION FILED DEC. 7, 1916.
1,261,631.
Patented Apr. 2, 1918.
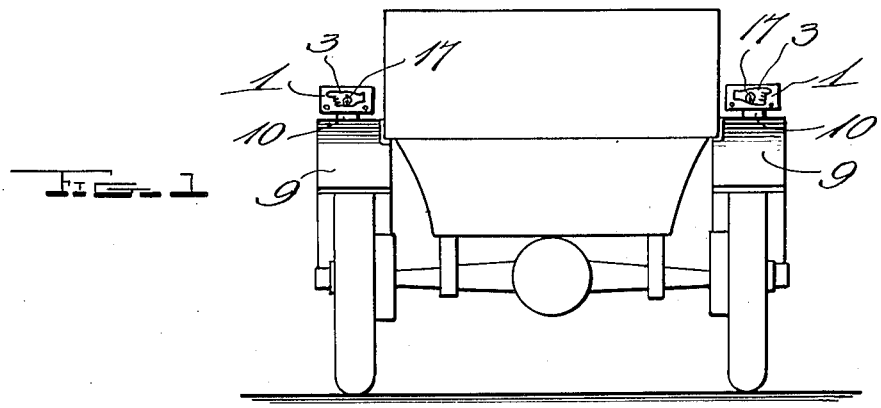
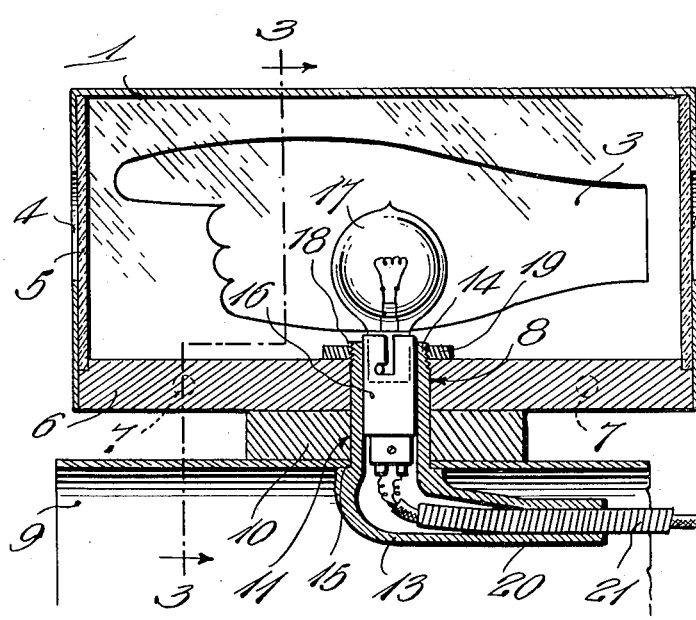
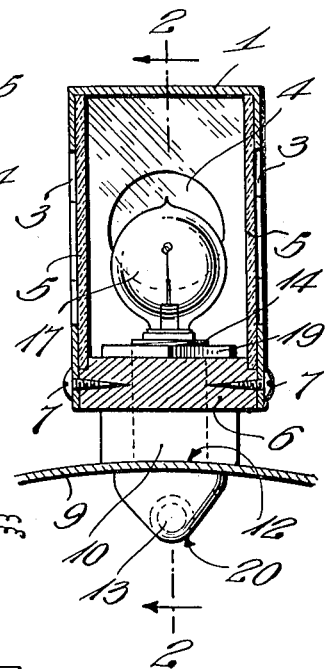
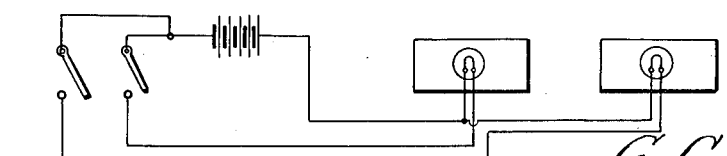
Inventor
G. C. Schutt
Witness
Attorneys

UNITED STATES PATENT OFFICE.

GEORGE CHESTER SCHUTT, OF BOWLING GREEN, OHIO.

AUTOMOBILE SAFETY-SIGNAL.

1,261,631. Specification of Letters Patent. Patented Apr. 2, 1918.

Application filed December 7, 1916. Serial No. 135,661.

*To all whom it may concern:*

Be it known that I, GEORGE C. SCHUTT, a citizen of the United States, residing at Bowling Green, in the county of Wood and State of Ohio, have invented certain new and useful Improvements in Automobile Safety-Signals; and I do declare the following to be a full, clear, and exact description of the invention, such as will enable others skilled in the art to which it appertains to make and use the same.

This invention relates to new and useful improvements in automobile safety signals, and the primary object of the invention is to provide a signal operable by the driver of the automobile, to notify others of a maneuver about to be made by the automobile.

Another object of the invention is to provide a device of this character which consists of a pair of signals placed one on each side of the automobile or on the rear guards of the same, and which are adapted to be illuminated separately by electric lamps, to indicate the direction in which the automobile is about to be turned.

Another object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanaying drawings:—

Figure 1 is a rear elevation of an automobile showing the signals applied to the guards of the same;

Fig. 2 is a vertical longitudinal section through one of the casings;

Fig. 3 is a vertical transverse section; and

Fig. 4 is a diagrammatic view of the circuit that lights the lamp.

In describing my invention, I shall refer to the drawings in which similar reference characters designate corresponding parts throughout the several views. My improved automobile safety signal, comprises two signal casings or indicators, that are fastened to the rear guards of an automobile, one on each guard, and as these casings are identical in construction for the sake of brevity I will only specifically describe one of them.

The signal comprises a substantially rectangular shaped narrow casing 1 which has in its opposite side walls 2, openings 3 which may be either in the shape of hands, arrowheads, etc., it being merely essential that they should point outwardly from the machine. The casing 1 is also provided with openings 4 at its opposite ends. The openings 3 and 4 in the casing are covered with frosted glass 5 or any transparent material as desired, so as to protect the interior of the casing. This casing 1 is formed with an open bottom, in which is placed a base plate 6 secured therein by means of fastening screws 7 on opposite sides of the same. The base 6 is provided with a centrally disposed opening 8 therethrough, for a purpose to be hereinafter more fully described.

The casing 1 is adapted to be positioned on the guard 9 of the automobile, transversely across the same and is spaced therefrom by means of a spacing block 10 that is disposed between the base 6 and the upper surface of the guard. This spacing block 10 is provided with an opening 11 therein that is normally disposed in alinement with the opening 8 in the base. The lower face or bottom of the spacing block is concaved as shown at 12, so that the same may more readily grip the upper surface of the guard, especially if this guard is slightly curved as is common to the majority of types.

The casing is held in position on the guard by means of a clamping member 13 which comprises an L-shaped pipe joint having its upright portion 14 contracted and projecting upwardly through the alining openings 11 and 8 in the spacing block and base of the casing respectively. The guard 9 is also provided with an opening 15 therethrough which is disposed in alinement with the aforesaid openings, through which the upright portion 14 of the clamping member is positioned. Owing to the fact that the clamping member is disposed beneath the guard, the shoulder formed by the reduced portion 14 will be disposed against the lower surface of the guard adjacent the opening 15 when the clamping member is in position.

Positioned within the portion 14 of the L-shaped clamping member is a plug connection 16 and adapted to contact therewith at its upper end and to be locked by any conventional form of fastening, is an electric lamp 17. The type of plug and socket illustrated in the accompanying drawings is the conventional form of Ediswan socket and such as is commonly used in devices of this character. This lamp 17 is disposed within the casing normally in alinement with the opening 3 in the opposite side walls of the same.

The upper end of the upright portion of the clamping member projects above the base 6 of the casing, and is externally threaded as shown at 18. Contacting with this externally threaded portion or upper end is a locking nut 19 which, when placed in position, will securely clamp the base and spacing block against the guard by drawing the shoulders of the clamping member beneath the guard up tightly against the bottom of the same.

Positioned in the outer end of the horizontal portion 20 of the clamping member 13 is one end of a flexible conduit 21, which has its other end, not shown, connected with a source of current carried by the automobile. The end of the conduit disposed in the clamping member has a pair of wires projecting therefrom which are connected with the terminals on the bottom of the plug 16, as clearly shown in Fig. 2 of the drawing. By this means, the lamp 17 is provided with a source of current which is operated by a switch controlled by the operator of the machine.

In operation, one of these signal casings is placed transversely across the rear guard at each side of the automobile and is held securely in position in a manner hereinbefore more fully described. To operate the device, the driver of the machine has only to turn the switch which controls the lamp in the casing, which is disposed in some easily accessible place, to light the lamp, and hence illuminate the casing so as to render the indicating sign clearly visible. The lamp 17 is preferably red so as to make the sign more discernible. If the operator wishes to turn to the right, he throws the switch that controls the signal on the right side of the machine, and hence lights the lamp, whereupon the hand or arrowhead will be visible, pointing to vehicles behind the automobile, the direction in which the machine is about to be turned. Owing to their position, the signals are also visible from the front of the machine. If it is desired to stop a machine suddenly, the operator may throw both switches, hence illuminating both of the signals so as to warn following vehicles of the sudden stop. The switches that control the signals may be operated by buttons, etc.

From the foregoing description of the construction and operation of my improved safety signal for automobiles, the manner of applying the same to use and the operation thereof will be readily understood, and it will be seen that I have provided a simple and efficient means for carrying out the objects of this invention.

I claim:—

1. A signal device of the class described comprising a casing, a spacing block beneath said casing adapted to be positioned on the rear guard of an automobile, a clamping member disposed beneath the guard comprising an L-shaped pipe with its upright portion extending through the guard and block into the casing, a locking nut on the upper projecting end of said portion in the casing, a plug in said member, an electric lamp in the casing connected with the plug, and a flexible conduit having one end positioned in the lower end of the L-shaped pipe and connected with the plug, and its other end to a source of current to operate the lamp.

2. A signal device of the class described comprising a casing, a centrally disposed spacing block beneath the lower edge of the casing, said block having a concaved lower face adapted to be positioned on the rear guard of an automobile, a clamping member comprising an L-shaped pipe disposed beneath said guard with its upright portion adapted to project through the same and the block into the casing, a plug disposed in said portion, an electric lamp in the casing connected with the plug, a locking nut on the upper end of the upright portion to lock the casing on the guard, and a flexible conduit having one end positioned in the horizontal portion of the pipe and connected with the plug, and its other end with a source of current whereby the lamp may be operated.

In testimony whereof I have hereunto set my hand in the presence of two subscribing witnesses.

GEORGE CHESTER SCHUTT.

Witnesses:
 FLOY BLINN,
 GLADYS BLINN.